E. B. MANNING.
Tea and Coffee Pot.
No. 35,457.
Patented June 3, 1862.
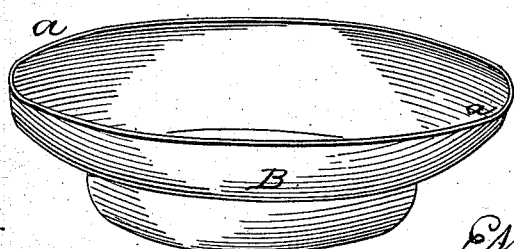

UNITED STATES PATENT OFFICE.

EDWARD B. MANNING, OF CROMWELL, CONNECTICUT.

IMPROVEMENT IN TEA AND COFFEE POTS.

Specification forming part of Letters Patent No. 35,457, dated June 3, 1862.

*To all whom it may concern:*

Be it known that I, EDWARD B. MANNING, of Cromwell, Connecticut, have invented a new and useful Article of Manufacture of or Mode of Constructing Britannia Tea and Coffee Pots; and I do hereby declare that the following is a full, clear, and exact description thereof, and of its construction and mode or manner of operation, reference being had to the accompanying drawings, and to the letters of reference marked thereon, making a part of this specification.

Britannia metal, as is well known, is one of the cheapest and at the same time most beautiful materials for being formed into coffee and tea pots, as it can easily be given any shape and takes a high polish, but because of its liability to melt at a comparatively low temperature it is not well adapted to uses where brought in contact with highly-heated surfaces, as for drawing or boiling tea, &c. Block-tin and other metals more durable but less beautiful have therefore to a very considerable extent taken its place for such purposes.

My invention consists in constructing the lower body and bottom of Britannia tea and coffee pots of iron or a metal which will bear a very high degree of heat without injury, and in so uniting the two together that such vessel may have a flat bottom to rest directly upon the range, &c., and the two metals will not separate from each other or leak by any heat to which the vessel may be properly subjected.

Figure 1 is a perspective view of such a coffee-pot, the bottom, which is more heavily shaded, representing the iron or stronger metal. Fig. 2 is a detached view of the bottom part of firmer metal.

The upper part, A, is made of britannia, and may be formed in any shape desired. The lower part, B, is struck up, to correspond in shape with the upper part, out of iron or any metal which will bear a very high degree of heat without melting or being injured. Such part B is intended to be heavily tinned and polished, so as to be rendered as smooth and bright and elegant in appearance as the britannia itself, and thus the whole vessel harmonizes, as if made of the same metal. This lower part, B, is joined to the britannia part A at the line or joint *a*, which is some distance above the bottom, and far enough so that the heat of the range or stove upon which the vessel may be placed for drawwing or steeping tea, &c., will not loosen or make leaky the joint *a*.

In all the attempts that have heretofore been made to prevent Britannia coffee and tea pots from being injuriously affected by the heat by combining some other metal with them such result has been sought to be obtained either by the use of feet or a ring or ledge placed under the vessel, or by making the bottom surface of copper, brass, or similar metal. In the former cases, when feet or a ring or ledge are used, the bottom of the coffee or tea pot is raised above the range or stove, and this interferes with the quick and proper action of steeping or boiling in such vessels. When the bottom surface of such articles have been made of firmer metal, the joints between the two different kinds of metal have been, in order to preserve the beauty and appearance of the pot, either directly on the edges of the bottom or just above it, so that the heated surface of the stove, &c., would act directly on such joint to unsolder it, or would be so near such joint as to produce the same effect, rendering the vessel leaky and useless. All such combinations have either raised the vessel from the heating-surface, thereby rendering the vessels less adapted, as every housekeeper knows, for the purposes for which intended, or the attached bottom has been extremely liable, if not certain, to become unsoldered and leaky whenever the pot was applied to its appropriate uses.

By my improved form and construction and of combining the firmer metal with the britannia the bottom of the vessel can be made and left flat, so as to come in close contact with the range, &c., thereby causing the operation of steeping, &c., to be quickest done, and in the preparation of tea and coffee the quickness with which the strength is drawn from the substance is very important and essential to the goodness of the decoction produced, and all danger or liability of the joint being loosened and the vessel rendered leaky is effectually prevented and obviated.

By heavily tinning the lower part of the vessel and polishing the same I can also produce a vessel of as neat and elegant appearance as if entirely made of britannia, but at the same time having all proper resistance to heat where such resistance is necessary.

Thus my invention or improvement does not consist in combining with or uniting to britannia a metal which will bear a greater degree of heat, but in so uniting the two metals by placing the joint or place of connection far enough from the bottom surface that such joints will not become leaky or destroyed by the heat, and securing a flat surface to rest on the heating-surface, and swaging the bottom part of the heavier metal into any artistic shape to correspond with the upper part of the vessel.

I do not claim the forming of pots and vessels of different kinds of metal, as this has been before done; but

What I claim as my invention, and desire to secure by Letters Patent, is—

An improvement in the construction of Britannia pots by making the lower body and bottom of such vessels of iron or a metal capable of bearing much greater heat than britannia, substantially as and for the purposes set forth.

E. B. MANNING.

Witnesses:
S. D. LAW,
HOWARD BIRD.